United States Patent
Ali et al.

(10) Patent No.: US 7,712,075 B1
(45) Date of Patent: May 4, 2010

(54) VISUALIZATION OF STEREOTYPE ELEMENT INSTANCES WITHIN A UNIFIED MODELING LANGUAGE MODEL

(75) Inventors: Syed A. Ali, Ottawa (CA); Dusko Misic, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/346,772

(22) Filed: Dec. 30, 2008

(51) Int. Cl.
*G06F 9/44* (2006.01)
(52) U.S. Cl. .................................... 717/105; 717/104
(58) Field of Classification Search ........................ None
See application file for complete search history.

(56) References Cited

U.S. PATENT DOCUMENTS

| 7,275,096 | B2 | 9/2007 | Green |
| 2006/0101376 | A1 | 5/2006 | Gutz et al. |
| 2006/0117037 | A1* | 6/2006 | Gutz et al. ................. 707/100 |
| 2007/0168383 | A1 | 7/2007 | Fildebrandt et al. |
| 2008/0127047 | A1 | 5/2008 | Zhang et al. |

OTHER PUBLICATIONS

Geoffrey Sparks, "Enterprise Architect 3.60 User Guide", 2004, Sparx Systems, pp. 224-245.*
Omondo, "Use the Omondo Profile Example", 2005, retrieved from: http://www.tutorial-omondo.com/omondoProfile/addprofile/index.html.*
Misic, "Authoring UML profiles using Rational Software Architect and Rational Software Modeler", Sep. 2005, IBM developerWorks.*
Boger et al. "Poseidon for UML User Guide", 2007, Gentleware AG, Chapter 13.*
Visual Paradigm, "Database Visual Architect Designer's Guide", 2007, Chapter 3.*
Wayne Diu, "Using the new features of UML Modeler in IBM Rational Software Architect Version 7.5", Sep. 2008, IBM developerWorks.*
Gorp, P.V., "Tutorial: Transformations Between Models Conforming to Different UML Profiles," [online] University of Antwerp, [retrieved Dec. 22, 2008] retrieved from the Internet: <http://www.sts.tu-harburg.de/teaching/ss-05/SWArch/ exercises/resourcesLab2/ Tutorial%20on%20UML%20profiles%20for%20Code%20-Generation.doc>. See: 1st para. under UML Profiles beginning "A UML profile . . . "; p. 1, last para. beginning Figure 1 illustrates . . . ; p. 3, Section-Tutorial Profiles, para. beginning "Stereotype definitions are visualized . . . "; Fig. 1; Fig. 3.

* cited by examiner

*Primary Examiner*—Lewis A. Bullock, Jr.
*Assistant Examiner*—Jue Wang
(74) *Attorney, Agent, or Firm*—Patents on Demand, P.A.; Brian K. Buchheit

(57) ABSTRACT

An UML model can be visually rendered upon a canvas of a graphical user interface of a software modeling application. The UML model can include at least one stereotype that extends an UML modeling element. A stereotype application can include values of attributes that are part of the stereotype that is applied on the UML modeling element. The visual rendering can include a stereotype application object which is able to be edited. Editing of the stereotype application object can result in changes to values of attributes of the stereotype application.

6 Claims, 3 Drawing Sheets

VISUALIZATION OF STEREOTYPE ELEMENT INSTANCES WITHIN A UNIFIED MODELING LANGUAGE MODEL

BACKGROUND

The present invention relates to the field of software engineering and, more particularly, to visualization of stereotype element instances within a unified modeling language model.

Stereotypes are one of three extensibility mechanisms in Unified Modeling Language (UML). They allow designers to extend the vocabulary of UML in order to create new model elements, derived from existing ones, but that have specific properties that are suitable for a particular problem domain or otherwise specialized usage.

Graphically, a stereotype is conventionally rendered within a CASE modeling tool as a name enclosed by guillemets (i.e., between <<and >>) and placed above the name of another element. If more than one stereotype is applied to a modeling element, they are delimited by commas within the guillemets.

This convention results in a number of problems when using modeling tools. For example, since stereotype applications are tied to a name of an element, they cannot be individually selected by a user of a conventional modeling tool. Thus, a modeler is unable to select an individual stereotype within a graphical modeling application (e.g., a CASE tool) and invoke a mechanism to change the value of attributes associated with the selected stereotype. In another example, it is non-intuitive and awkward to force a user to select a modeling element within a modeling application in order to modify values of attributes that are part of the stereotype application, which is a current technique utilized by UML modeling tools. The awkwardness results because the stereotype attributes being modified are not directly related to the selected element.

DETAILED DESCRIPTION

Figure 1:
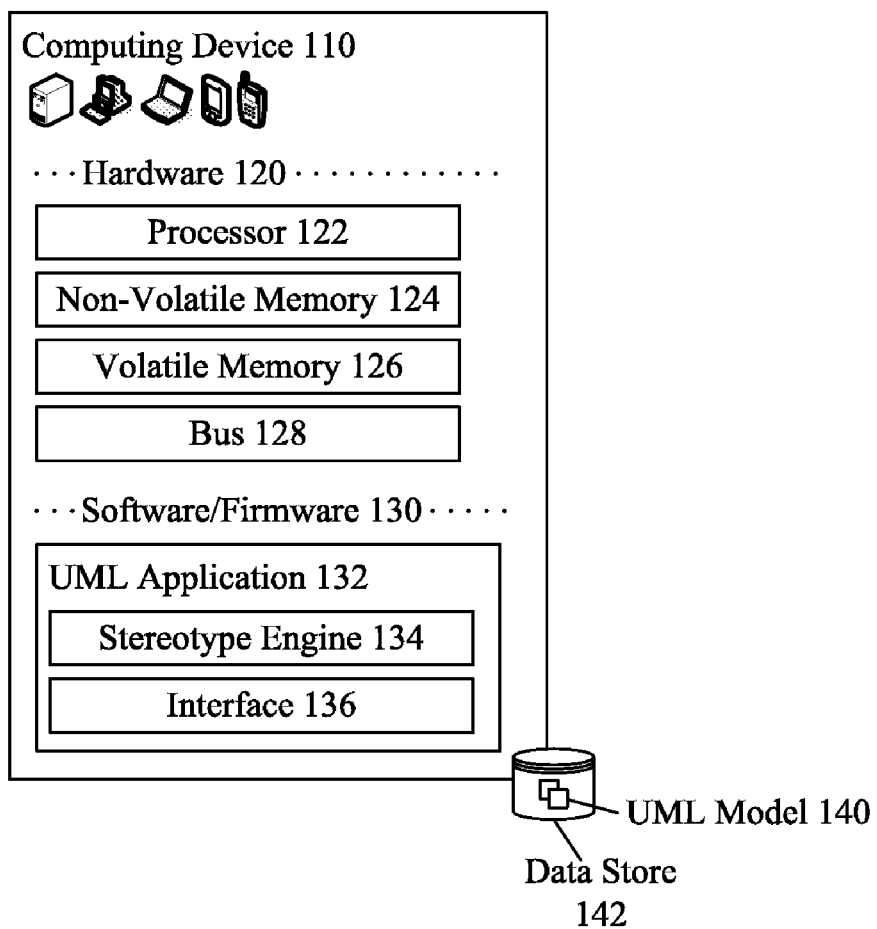
FIG. 1 is a schematic diagram illustrating a system for visualization of stereotype element instances within a unified modeling language model in accordance with an embodiment of the inventive arrangements disclosed herein.

The present disclosure provides a Unified Modeling Language (UML) software modeling tool that visualizes a stereotype application in the same manner that the tool visualizes relationships between modeling elements. That is, the software modeling tool can show a distinct visual object (e.g., a stereotype object) for each stereotype. Each stereotype object can be shown along with the relationships to modeling elements. A line which connects a stereotype object to a modeling element can denote a relationship. The relationship can denote the modeling element for which the stereotype extends. In one instance, each stereotype object can be interacted with allowing the object to be modified by a user.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, or device. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. Note that the computer usable or computer readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instruction means which implement the function/ act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for visualization of stereotype element instances within a unified modeling language (UML) model in accordance with an embodiment of the inventive arrangements disclosed herein. In system 100, an UML application 132 can present visualizations of one or more stereotypes of an UML model 140 within an interface 136. Model 140 can be stored within data store 142 which can be communicated to application 132.

Computing device 110 can be a hardware and/or software/ firmware entity able to present one or more UML stereotype visualizations. Hardware 120 can include a processor 122, non-volatile memory 124, volatile memory 126, and bus 128. Processor 128 can include one or more central processing units (CPU), graphics processing unit (GPU), and the like. Memory 124-126 can be used to store data associated with the presentation of stereotype information which can be conveyed to processor 128. Components 122-126 can be communicatively connected via bus 128. Bus 128 can be one or more communication subsystems able to convey information between components 122-126.

UML application 132 can be a software entity capable of presenting visualizations of one or more stereotypes. Application 132 can be a user-interactive graphical user interface (GUI) permitting presentation of stereotype information defined within UML model 140. Application 132 can include application frameworks and/or Computer Aided Software Engineering (CASE) tools such as RATIONAL SOFTWARE ARCHITECT, ECLIPSE, and the like. Application 132 can execute locally within hardware 120. Alternatively, application 132 can be a remotely executing application interacting within computing device 110 environment.

Stereotype engine 134 can be used to identify and show stereotypes and stereotype element instances. Engine 134 can present stereotype information and render one or more stereotype objects within an interface 136. Engine 134 can utilize the hierarchical structure of UML model 140 to present associations between stereotype objects and other modeled elements. For instance, a connecting line between a stereotype element and a stereotype object representing a stereotype instance can be presented. Engine 134 can enable the showing of stereotype attribute information associated with implementation details. Further, engine 134 can include rules enabling domain specific handling of stereotypes. For example, presentation of a stereotype object can vary when the stereotype is used in different domains. In one embodiment, engine 134 can permit presented stereotype objects to be user editable based on model 140 configuration, application 132 settings, and the like.

Interface 136 can be a renderable area within an interface component able to visually present stereotype information. Based on application 132 settings and/or user configurations, UML model 140 can be presented within interface 136. For instance, interface 136 can include a drawing canvas within a software modeling application presented on a computer display. Interface 136 can comprise a single viewable screen area and/or multiple screen areas.

Drawings presented herein, are for illustrative purposes only and should not be construed to limit the invention in any regard. Data store 142 can be an entity local to device 110 or can be a remotely located data store. As used herein, stereotype information can include, stereotype definitions, objects associated with a stereotype and/or stereotype instance, graphical/visual representations of stereotype information, and the like.

Figure 2:
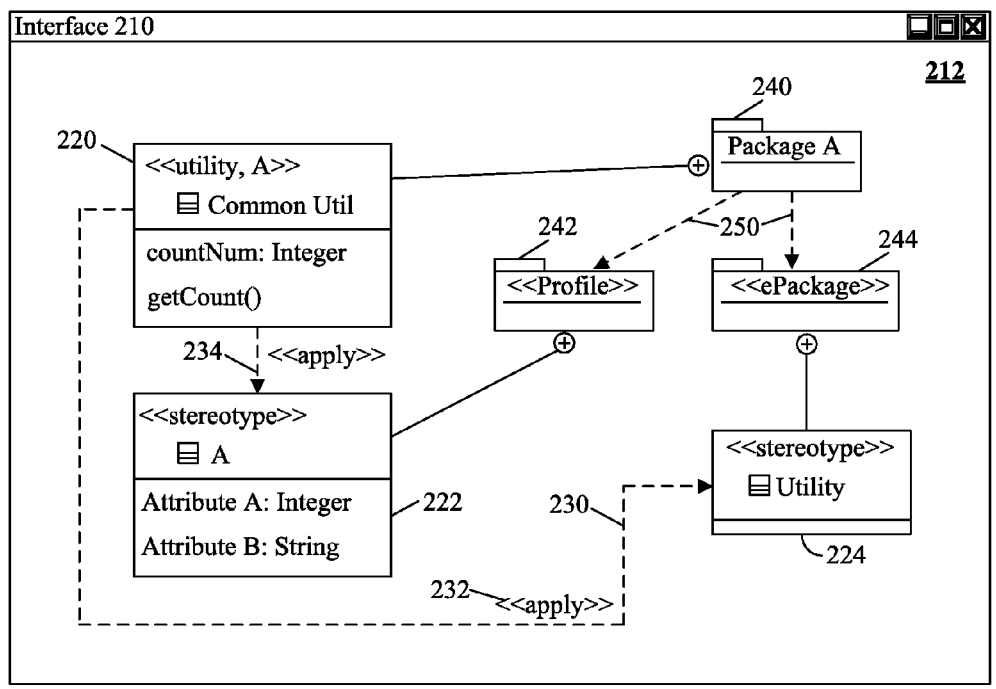
FIG. 2 is a schematic diagram illustrating an interface presenting stereotype element instances within a unified modeling language model in accordance with an embodiment of the inventive arrangements disclosed herein.

FIG. 2 is a schematic diagram illustrating an interface 210 presenting stereotype element instances within a unified modeling language model in accordance with an embodiment of the inventive arrangements disclosed herein. Interface 210 can be presented in the context of system 100. In interface 210, a renderable area 212 (e.g., canvas) can be used to present stereotype elements defined in a unified modeling language (UML) model. Stereotype elements and stereotype instances can be visually presented in the interface 210.

As used herein, objects 220-242 can be elements within an UML hierarchal structure which can be represented as graphical entities within interface 210. Objects 240, 242 can be modeling elements able to extend defined stereotypes. Object 220 can represent a stereotype instance within the UML model. Defined stereotype element instances within an UML model can be represented as stereotype objects 222, 224.

In interface 210, object 240 can represent an UML package which can own UML element 220. Object 220 can be a modeling element associated with the UML model presented in area 212. Objects 222-224 can represent stereotypes which can be applied to object 220. The object 242 can be an UML profile which can have ownership of stereotype 222. Similarly, object 244 can be an UML profile which can own stereotype 224. Stereotypes 222 and 224 can be applied to the element 220 once the profiles 242, 244 are applied to the package which owns the element (e.g. element 240). The application of the profiles 242, 244 to the package 240 can be represented by a connecting line 250. In the same manner, stereotype instances can be represented by connecting lines 230, 234. In one embodiment, stereotype instances can be represented by a dashed line connecting a modeling element to an applied stereotype.

Objects 222-224 can be presented similar to UML modeling elements and/or modeling elements 240,242. Objects 222-224 can be presented with classification information, naming details, attribute information, and the like. Classification information can be presented within guillemets (e.g., <<and >>) in the object header area. Naming details can be shown simultaneously in the object header along with optional graphical customizations. Customizations can include application specific icons, domain relevant icons, user specified images, and the like.

In area 212, connecting lines 230, 234 can denote a stereotype being applied to an element. For example, dashed line 230 can indicate stereotype 224 is applied to element 220. Connecting line 230 can include a continuous line, dotted line, and the like. Attributes of connecting line 230 can vary depending on implementation and can include, color, size/ weight, connection indicators, and the like.

Application indicator 232 can be used to denote the application of a stereotype. For example, indicator 232 can be presented proximate to connecting line 230 which can show stereotype 224 being applied to element 220. Indicator 232 can be affected by user customization, application settings, domain specific presets, and the like. For example, when a stereotype object 224 is associated with another UML element, a keyword (e.g., <<apply>>) can be shown.

In one embodiment, elements 220-232 can be modified by a user, enabling interaction with a presented UML model. In the embodiment, stereotype associations can be changed through user interaction with a dialog interface. For instance, a properties pop-up window can be presented enabling a user to modify a selected stereotype application. Associations can be deleted, which results in the associated modeling element no longer being an instance of the stereotype that connected the deleted stereotype association. In the canvas 212, the connecting line that previously indicated the association between the modeling element and the stereotype will be removed. Further, selecting the connection line 230 can allow a user to view the values of the attributes from the associated stereotype.

Drawings presented herein are for illustrative purposes only and should not be construed to limit the invention in any regard. In one embodiment, elements 220-224 can be presented separately within area 212. Alternatively, a different area can be allocated to present elements 240-244. Functionality expressed in interface 210 can be presented through interface entities including, but not limited to, pull-down menus, context menus, and the like.

Figure 3:
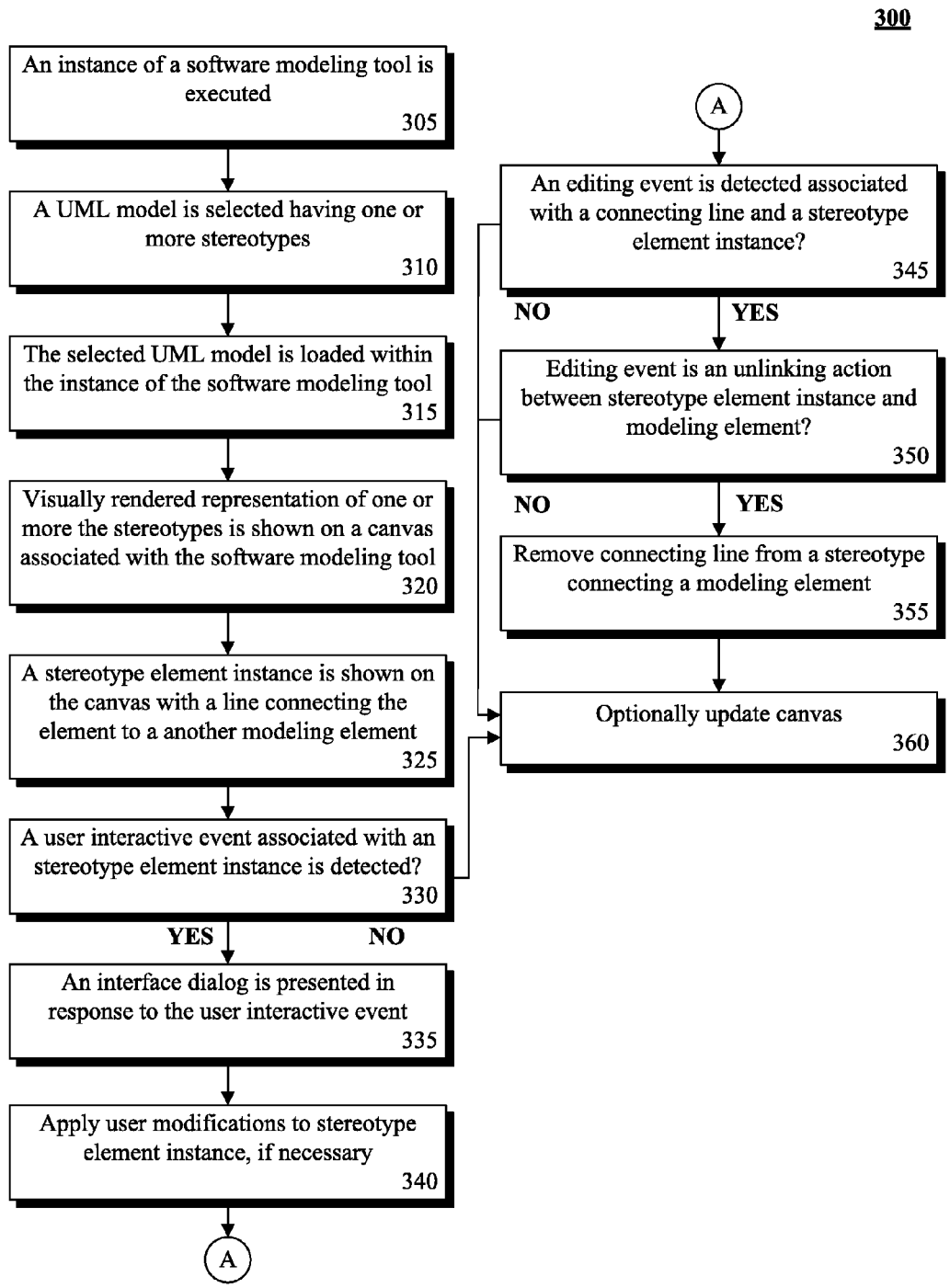
FIG. 3 is a schematic diagram illustrating a method for visualization of stereotype element instances within a unified modeling language model in accordance with an embodiment of the inventive arrangements disclosed herein.

FIG. 3 is a schematic diagram illustrating a method 300 for visualization of stereotype element instances within a unified modeling language (UML) model in accordance with an embodiment of the inventive arrangements disclosed herein. Method 300 can be performed within the context of system 100. In method 300, a stereotype can be shown within a software modeling tool. The stereotype can be represented by a user-interactive stereotype object placed within a renderable canvas area of the software modeling tool.

In step 305, an instance of a software modeling tool can be executed within a computing environment. The modeling tool can be a user-interactive graphical user interface such as an integrated development environment (IDE) or a component thereof. In step 310, an UML model is selected having one or more stereotype instances defined within the model. In step 315, the selected UML model is loaded within the instance of the software modeling tool. In step 320, a representation of one or more stereotype instances can be visually rendered on a canvas associated with the software modeling tool. In step 325, a stereotype element instance can be shown on the canvas with a line connecting the element with another modeling element. In step 330, if a user interactive event associated with the stereotype is detected the method can continue to step 335, else proceed to step 360.

In step 335, an interface dialog can be presented in response to the detected user interactive event. The dialog can present stereotype element instance information and can permit modification of the element details. In step 340, if there are modifications to the details of stereotype element instance presented in the dialog, the modifications can then be applied to the element. In step 345, if an editing event is detected associated with a connecting line and a stereotype element instance, the method can continue to step 350, else proceed to step 360. In step 350, if the editing event is an unlinking action between stereotype element instance and modeling element, the method can continue to step 355, else proceed to step 360. In step 355, the modeling element and the stereotype element instance can be unlinked and the connecting line between the stereotype element instance and the modeling element can be removed. In step 360, the canvas associated with the software modeling tool can be optionally updated. The update can include, but is not limited to, updating information associated with one or more objects, redrawing elements within the canvas, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A Unified Modeling Language (UML) modeling method comprising:

visually rendering an UML model upon a canvas of a graphical user interface of a software modeling application, wherein said UML model comprises at least one stereotype application that extends an UML modeling element, wherein a stereotype application comprises values of attributes that are part of the stereotype that is applied on the UML modeling element, wherein the visual rendering comprises a stereotype application object which is able to be edited, wherein editing of the stereotype application object results in changes to values of attributes of the stereotype application;

representing the stereotype application on the canvas as a line connecting the stereotype application object and the UML modeling element;

detecting an event granting focus to a line connecting to the stereotype application object;

receiving to a user interactive input while the line has focus, wherein the user interactive input represents an input to unapply the stereotype;

responsive to the user interactive input, removing a stereotype application object associated with the stereotype from the canvas; and removing from the canvas all lines that were previously connected to the removed stereotype application object.

2. The method of claim 1, further comprising:

representing the stereotype application on the canvas as a line connecting the stereotype application object to the UML modeling element being extended by the stereotype;

receiving a user interactive input related to selecting the line; and responsive to the user interactive input, presenting details of the stereotype application object on the canvas.

3. A computer program product for Unified Modeling Language comprising a tangible computer usable medium having computer usable program code embodied therewith, the computer program product comprising:

computer usable program code stored in the tangible computer usable medium configured to visually render an UML model upon a canvas of a graphical user interface of a software modeling application; wherein said UML model comprises at least one stereotype application that extends an UML modeling element, wherein a stereotype application comprises values of attributes that are part of the stereotype that is applied on the UML modeling element, wherein the visual rendering comprises a stereotype application object which is able to be edited, wherein editing of the stereotype application object results in changes to values of attributes of the stereotype application;

computer usable program code stored in the tangible computer usable medium configured to represent the stereotype application on the canvas as a line connecting the stereotype application object and the UML modeling element;

computer usable program code stored in the tangible computer usable medium configured to detect an event granting focus to a line connecting to the stereotype application object;

computer usable program code stored in the tangible computer usable medium configured to receive to a user interactive input while the line has focus, wherein the user interactive input represents an input to unapply the stereotype;

computer usable program code stored in the tangible computer usable medium configured to, responsive to the user interactive input, remove a stereotype application object associated with the stereotype from the canvas; and computer usable program code stored in the tangible computer usable medium configured to remove from the canvas all lines that were previously connected to the removed stereotype application object.

4. The computer program product of claim 3, further comprising:

computer usable program code stored in the tangible computer usable medium configured to represent the stereotype application on the canvas as a line connecting the stereotype application object to the UML modeling element being extended by the stereotype;

computer usable program code stored in the tangible computer usable medium configured to receive a user interactive input related to selecting the line; and computer usable program code stored in the tangible computer usable medium configured to, responsive to the user interactive input, present details of the stereotype application object on the canvas.

5. A Unified Modeling Language modeling system comprising:

a processor;

a non volatile memory;

a volatile memory; and a bus connecting the processor, non volatile memory and volatile memory, wherein at least one of the non volatile memory and the volatile memory store computer program product able to be utilized by the system, where execution of the computer program product using the processor, the non volatile memory, and the volatile memory causes the system to:

visually render an UML model upon a canvas of a graphical user interface of a software modeling application; wherein said UML model comprises at least one stereotype application that extends an UML modeling element, wherein a stereotype application comprises values of attributes that are part of the stereotype that is applied on the UML modeling element, wherein the visual rendering comprises a stereotype application object which is able to be edited, wherein editing of the stereotype application object results in changes to values of attributes of the stereotype application;

represent the stereotype application on the canvas as a line connecting the stereotype application object and the UML modeling element;

detect an event granting focus to a line connecting to the stereotype application object;

receive to a user interactive input while the line has focus, wherein the user interactive input represents an input to unapply the stereotype;

responsive to the user interactive input, remove a stereotype application object associated with the stereotype from the canvas; and remove from the canvas all lines that were previously connected to the removed stereotype application object.

6. The system of claim 5, wherein execution of the computer program product using the processor, the non volatile memory, and the volatile memory further causes the system to:

represent the stereotype application on the canvas as a line connecting the stereotype application object to the UML modeling element being extended by the stereotype;

receive a user interactive input related to selecting the line; and responsive to the user interactive input, present details of the stereotype application object on the canvas.

* * * * *